United States Patent
Etkin et al.

(10) Patent No.: US 10,069,541 B2
(45) Date of Patent: Sep. 4, 2018

(54) DISTRIBUTED ANTENNA SYSTEM OVER ETHERNET

(71) Applicant: Hewlett-Packard Development Company, L.P., Houston, TX (US)

(72) Inventors: Raul Hernan Etkin, Palo Alto, CA (US); Sung-Ju Lee, Palo Alto, CA (US); Jung Gun Lee, Palo Alto, CA (US); Eugene Chai, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 244 days.

(21) Appl. No.: 14/773,031

(22) PCT Filed: Mar. 7, 2013

(86) PCT No.: PCT/US2013/029674
§ 371 (c)(1),
(2) Date: Sep. 4, 2015

(87) PCT Pub. No.: WO2014/137347
PCT Pub. Date: Sep. 12, 2014

(65) Prior Publication Data
US 2016/0028447 A1 Jan. 28, 2016

(51) Int. Cl.
*H04B 7/024* (2017.01)
*H04J 3/06* (2006.01)
(Continued)

(52) U.S. Cl.
CPC .......... *H04B 7/024* (2013.01); *H04B 7/0456* (2013.01); *H04J 3/0658* (2013.01);
(Continued)

(58) Field of Classification Search
CPC ............. H04W 88/085; H04W 52/386; H04W 56/001; H04W 76/02
(Continued)

(56) References Cited

U.S. PATENT DOCUMENTS 7,554,952 B2    6/2009   Kogiantis et al.
8,085,862 B2   12/2011   Wang
(Continued)

FOREIGN PATENT DOCUMENTS

EP     2180334 A2    4/2010

OTHER PUBLICATIONS

Gordon L. Stuber et al., "Broadband MIMO-OFDM Wireless Communications," Feb. 2004, pp. 271-294, Proceedings of the IEEE, vol. 92, No. 2, IEEE.
(Continued)

*Primary Examiner* — Jaime Holliday
(74) *Attorney, Agent, or Firm* — Mannava & Kang, P.C.

(57) ABSTRACT

According to an example, a distributed antenna system includes a central processing apparatus and a plurality of antenna apparatuses connected to the central processing apparatus via Ethernet cables through an Ethernet switch. The plurality of antenna apparatuses are spatially distributed with respect to each other and the central processing apparatus is to communicate Ethernet packets to the plurality of antenna apparatuses. In addition, the plurality of antenna apparatuses are to wirelessly transmit signals corresponding to data contained in the Ethernet packets in a substantially coordinated and synchronized manner with respect to each other.

18 Claims, 6 Drawing Sheets

(51) Int. Cl.
  *H04B 7/0456* (2017.01)
  *H04L 27/36* (2006.01)
  *H04W 52/38* (2009.01)
  *H04W 56/00* (2009.01)
  *H04W 88/08* (2009.01)

(52) U.S. Cl.
  CPC ......... *H04L 27/364* (2013.01); *H04W 52/386* (2013.01); *H04W 56/001* (2013.01); *H04W 88/085* (2013.01)

(58) Field of Classification Search
  USPC ............... 370/338, 343, 344; 455/561, 562.1
  See application file for complete search history.

(56) References Cited

U.S. PATENT DOCUMENTS

| | | |
|---|---|---|
| 8,351,987 B2 | 1/2013 | Boch |
| 2008/0219338 A1* | 9/2008 | Chrabieh ........... H04B 17/0085 375/231 |
| 2009/0300469 A1 | 12/2009 | Rajakarunanayake |
| 2010/0166090 A1 | 7/2010 | Ho |
| 2010/0290555 A1 | 11/2010 | Mege |
| 2011/0244914 A1* | 10/2011 | Venkatraman ........ H04W 52/40 455/522 |
| 2012/0057572 A1* | 3/2012 | Evans ................. H04W 88/085 370/338 |
| 2012/0230233 A1 | 9/2012 | Jia et al. |
| 2012/0263152 A1 | 10/2012 | Fischer et al. |
| 2014/0219267 A1* | 8/2014 | Eyuboglu ........... H04W 56/001 370/350 |

OTHER PUBLICATIONS

International Search Report and Written Opinion, International Application No. PCT/US2013/029674, dated Dec. 6, 2013, pp. 1-10.

* cited by examiner

DISTRIBUTED ANTENNA SYSTEM OVER ETHERNET

BACKGROUND

A distributed antenna system includes a central processing facility and a set of spatially-distributed antennas that are directly connected to the central processing facility. The spatially-distributed antennas are directly connected to the central processing facility through high-bandwidth capable connections, such as fiber optic cables, coaxial cables, or Ethernet cables. The central processing facility communicates the analog or digital RF signals through the connections for transmission of the RF signals by the antennas. The use of distributed antenna systems has significantly increased in recent years due to the cost savings that may be afforded by such systems, while also affording increased signal coverage.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
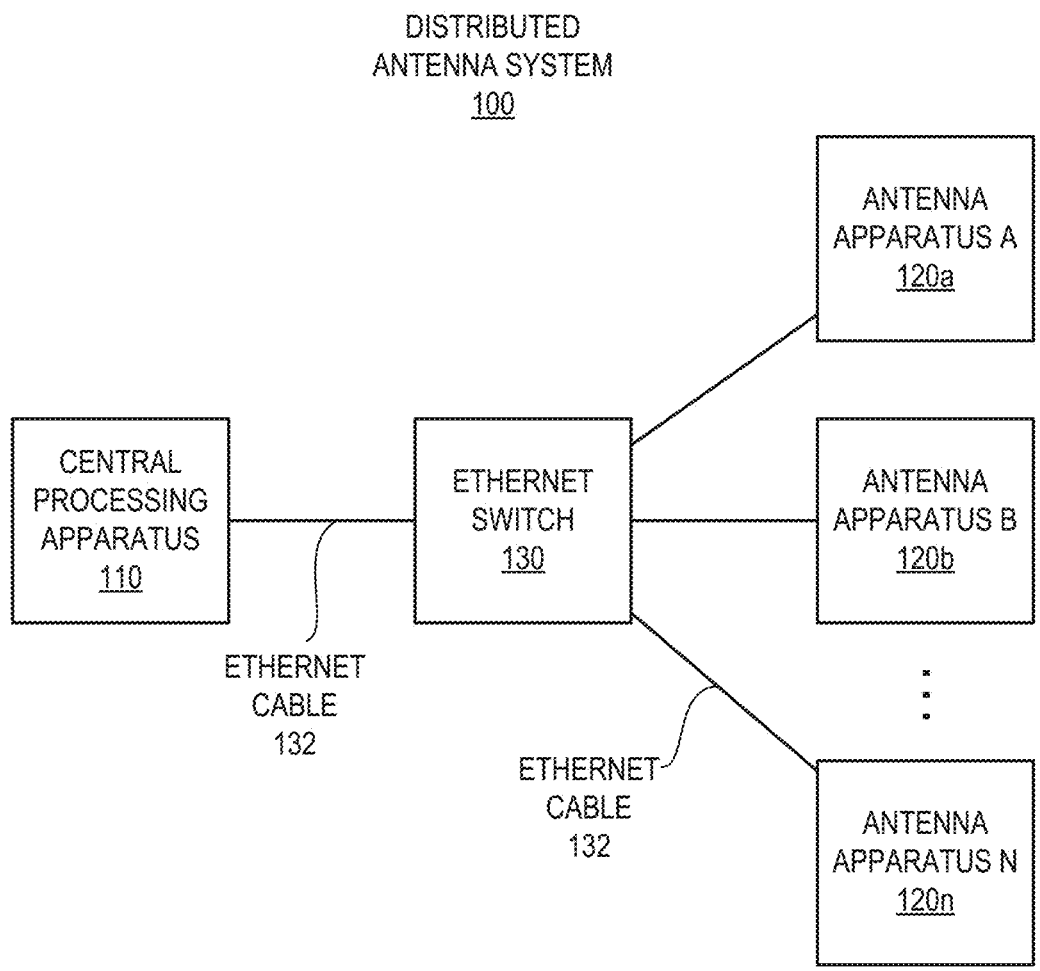
FIG. 1 depicts a simplified block diagram of a distributed antenna system, which may implement various features disclosed herein, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are methods and apparatuses for communicating signals through a distributed antenna system composed of a central processing apparatus and a plurality of antenna apparatuses. The distributed antenna system disclosed herein may be implemented in a switched Ethernet network environment such that the antenna apparatuses are not directly connected to the central processing apparatus, but instead, are connected through an Ethernet switch in the Ethernet network environment. In one example, the distributed antenna system disclosed herein may be implemented in an existing enterprise local area network (LAN) infrastructure environment. Thus, for instance, the central processing apparatus may communicate packetized data across the switched Ethernet network to the antenna apparatuses. In addition, the antenna apparatuses may wirelessly transmit signals contained in the packetized data in a substantially coordinated and synchronized manner with respect to each other.

As disclosed herein, all of the information transfer between the antenna apparatuses and the central processing apparatus may occur over an Ethernet backhaul. In one regard, because the capacity of the Ethernet backhaul may be relatively limited, the amount of Ethernet traffic that is sent from the central processing apparatus to the antenna apparatuses may be substantially minimized, without unnecessarily limiting the wireless bandwidth. As such, the traffic communicated from the central processing apparatus to the antenna apparatuses may be compressed, as discussed herein.

Generally speaking, raw signal information, in terms of I/Q (in phase/quadrature) samples, may require a relatively large amount of Ethernet bandwidth. For instance, in a QPSK (quadrature phase shift keying) I/Q stream, where 2 data bits are encoded in each QPSK constellation point, each I and Q sample is represented with a 16-bit fixed point number, giving a total of 4 bytes that is needed to convey 2 bits of information from the central processing apparatus to an antenna apparatus. The bandwidth needed to convey raw QPSK I/Q samples may therefore be at least 16 times that needed by the original data frame.

Through implementation of the methods and apparatuses disclosed herein, an encoding mechanism may be implemented to substantially minimize the bandwidth necessary to transmit RF signals over the Ethernet backhaul from the central processing apparatus to the antenna apparatuses. That is, instead of communicating I/Q sequences directly to the antenna apparatuses, according to an example, the central processing apparatus may communicate data requiring relatively less bandwidth to the antenna apparatuses and the antenna apparatuses may assemble the I/Q sequences relevant to the respective antenna apparatuses. In addition, by distributing some of the I/Q sequence processing to the antenna apparatuses, the processing load on the central processing apparatus may also be substantially reduced.

With reference first to FIG. 1, there is shown a simplified block diagram of a distributed antenna system 100, which may implement various features disclosed herein, according to an example. It should be understood that the distributed antenna system 100 may include additional elements and that some of the elements depicted therein may be removed and/or modified without departing from a scope of the distributed antenna system 100.

The distributed antenna system 100 may include a central processing apparatus 110 and a plurality of antenna apparatuses 120a-120n, in which "n" represents an integer greater than 1. The antenna apparatuses 120a-120n may be connected to the central processing apparatus 110 through an Ethernet switch 130 via Ethernet cables 132. In this regard, the central processing apparatus 110 may communicate Ethernet packets containing data to the antenna apparatuses 120a-120n, in which the antenna apparatuses 120a-120n may extract the data and wirelessly transmit signals containing the data. In addition, because the antenna apparatuses 120a-120n are connected to the central processing apparatus 110 through the Ethernet switch 130, the antenna apparatuses 120a-120n may be spatially distributed with respect to each other and the central processing apparatus 110. One result of this spatial distribution is that the coverage area over which the signals may be wirelessly transmitted may substantially be increased as compared with antenna systems in which antennas are directly connected to a base station.

According to an example, the central processing apparatus 110 is to generate the Ethernet packets such that each of the antenna apparatuses 120a-120n wirelessly transmits the signals in a substantially coordinated and synchronized manner with respect to each other. That is, for instance, each of the antenna apparatuses 120a-120n may wirelessly transmit signals corresponding to the same data such that beamforming of the signals may be accomplished by the antenna apparatuses 120a-120n. The antenna apparatuses 120a-120n may have hardware that adjusts the phases and/or amplitudes of the signals transmitted by the antenna apparatuses 120a-120n to assist in accomplishing the substantial coordination and synchronization. In one regard, the signals transmitted by the antenna apparatuses 120a-120n may not need to be precisely coordinated and synchronized because the receivers of the signals may be able to compensate for some variations in the signals while still being able to accurately process the data contained in the signals. The substantial coordination and synchronization of the signal transmissions by the antenna apparatus 120a-120n may therefore be defined as coordination and synchronization that is sufficient to enable the receivers of the signals to compensate for variations in the signals.

Although not shown, Ethernet packets communicated from the central processing apparatus 110 may travel through a plurality of Ethernet switches 130 prior to reaching the antenna apparatuses 120a-120n. In one example, the distributed antenna system 100 may be incorporated into an existing switched network. In other examples, a switched network, i.e., a network containing a plurality of Ethernet switches 130, which may also be considered as a Local Area Network (LAN), may be formed to incorporate the distributed antenna system 100. In any regard, the Ethernet switch(es) 130 may handle both Ethernet packets communicated by the central processing apparatus 110 as well as Ethernet packets communicated from other nodes in the switched network. Accordingly, similarly to conventional switches in a switched network environment, for instance, the Ethernet switch 130 may determine the destination addresses of the Ethernet packets communicated from the central processing apparatus 110 and may forward the Ethernet packets to their intended destination addresses.

According to an example, the central processing apparatus 110 and the antenna apparatuses 120a-120n implement various techniques to substantially optimize (e.g., minimize) the amount of bandwidth consumed in communicating the Ethernet packets from the central processing apparatus 110 to the antenna apparatuses 120a-120n. For instance, the central processing apparatus 110 may include modules to communicate Ethernet packets that contain data that the antenna apparatuses 120a-120n may use to generate a stream of quadrature amplitude modulation (QAM) in phase/quadrature (I/Q) symbols. In addition, each of the antenna apparatuses 120a-120n may include modules to assemble the QAM I/Q symbols into I/Q sequences that the antenna apparatuses 120a-120n may wirelessly transmit. In one regard, therefore, the antenna apparatuses 120a-120n may obtain the I/Q sequences without requiring that the central processing apparatus 110 communicate full I/Q sequences over the switched Ethernet network.

Figure 2:
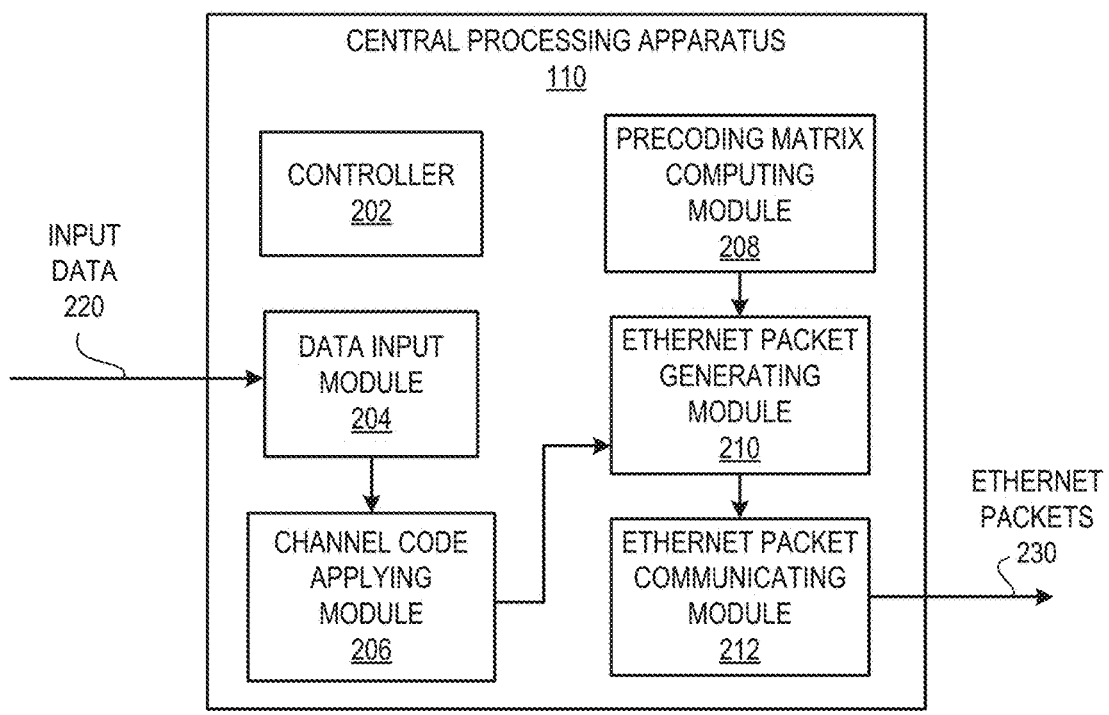
FIG. 2 depicts a simplified block diagram of the central processing apparatus depicted in FIG. 1, according to an example of the present disclosure.
Figure 3:
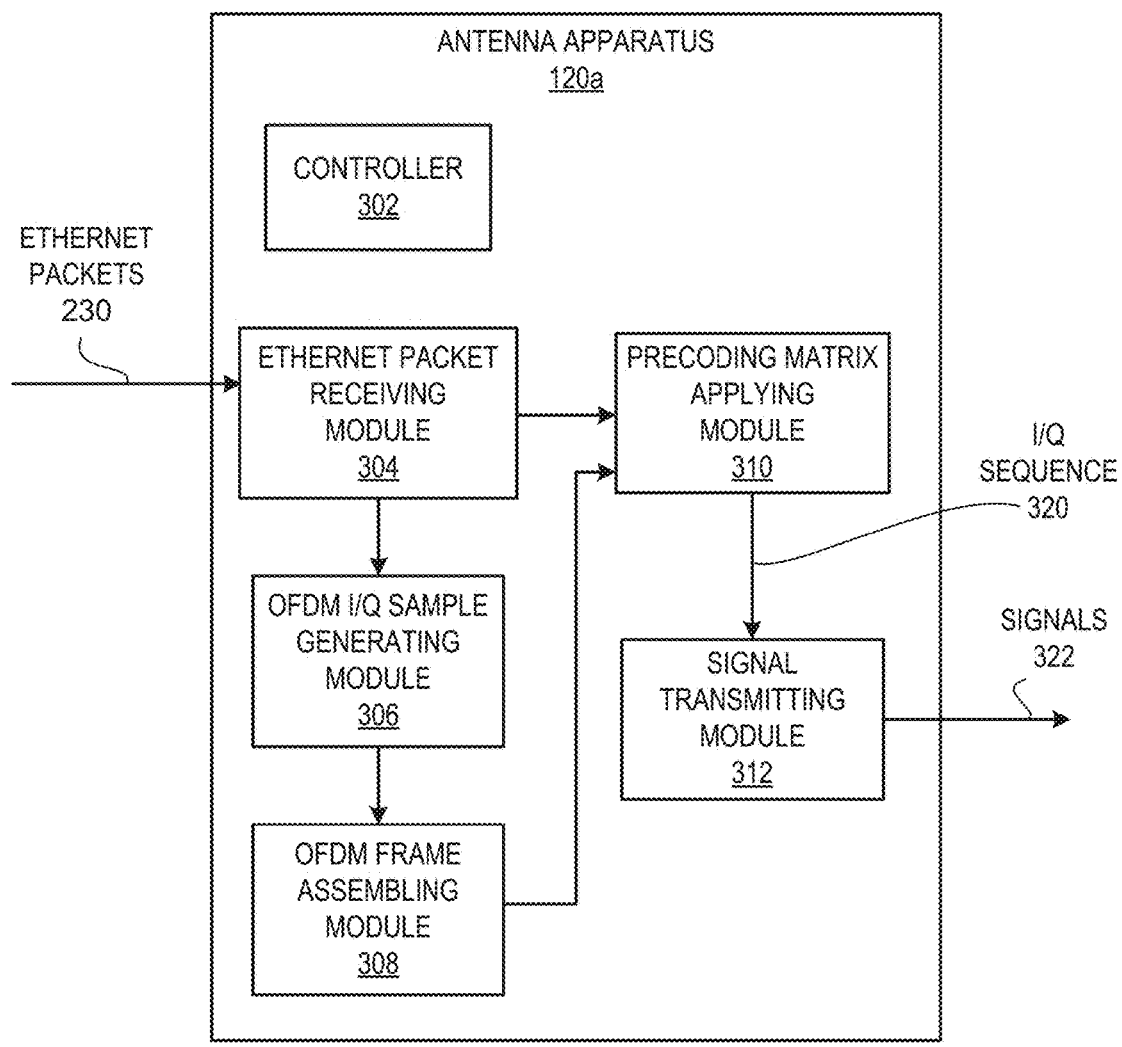
FIG. 3 depicts a simplified block diagram of an antenna apparatus depicted in FIG. 1, according to an example of the present disclosure.

Turning now to FIGS. 2 and 3, there are respectively shown simplified block diagrams 200 and 300 of the central processing apparatus 110 and an antenna apparatus 120a depicted in FIG. 1, according to an example. It should be understood that the central processing apparatus 110 and the antenna apparatus 120a may include additional elements and that some of the elements depicted therein may be removed and/or modified without departing from the scopes of either of the central processing apparatus 110 and the antenna apparatus 120a.

With reference first to FIG. 2, the central processing apparatus 110 may include a controller 202, a data input module 204, a channel code applying module 206, a precoding matrix computing module 208, an Ethernet packet generating module 210, and an Ethernet packet communicating module 212. As shown in FIG. 2, the data input module 204 may receive input data 220 that is to be transmitted by the antenna apparatuses 120a-120n. The data input module 204 may receive the input data 220 as a stream of data bits or may receive the input data 220 as an entire compilation of data bits. In addition, the data input module 204 may receive the input data 220 from any suitable source, such as a computer, a server, a cellular telephone, etc.

The data input module 204 may forward the bits of the input data to the channel code applying module 206. The channel code applying module 206 may apply a channel code to the bits of input data 220 to provide resilience against random errors that may occur over the wireless channel. According to an example, the channel code applying module 206 may apply a channel code to the input data bits for real-time error correction and may convert a stream of the input data bits into a single codeword. The channel code applying module 206 may forward the channel coded input data bits to the Ethernet packet generating module 210.

The precoding matrix generating module 208 may compute a precoding matrix to be implemented by the antenna apparatuses 120a-120n in determining which portions of an orthogonal frequency division multiplexing (OFDM) frame each of the antenna apparatuses 120a-120n is to respectively transmit. Generally speaking, the precoding matrix may specify how symbols corresponding to each data stream are to be mapped to the antenna apparatuses 120a-120n. Thus, if N data streams are to be transmitted over M antenna apparatuses, the precoding matrix is an M×N matrix (with M rows and N columns). For example, if M=2 and N=1, the 2×1 mapping matrix with first row [1] and second row [1] repeats the symbols of the data stream into both transmit antenna apparatuses. The antenna apparatuses 120a-120n may determine the respective signals to be sent by multiplying the symbols of the various streams (represented as a vector) by the precoding matrix, and may extract the row corresponding to the given antenna apparatus to determine which data to send over the wireless channel. In addition, the precoding matrix generating module 208 may forward the computed precoding matrix to the Ethernet packet generating module 210.

The Ethernet packet generating module 210 may generate the channel coded input data bits and the precoding matrix into Ethernet packets. The Ethernet packet generation may also include insertion of destination addresses corresponding to the antenna apparatuses 120a-120n in the headers of the Ethernet packets. In addition, the Ethernet packet communicating module 212 may communicate the Ethernet packets 230 to the antenna apparatuses 120a-120n. For instance, and as discussed above, the Ethernet packets 230 may be communicated to the antenna apparatuses 120a-120n through an Ethernet switch 130 prior to reaching the antenna apparatuses 120a-120n.

The controller 202 may be a microprocessor, a microcontroller, an application specific integrated circuit (ASIC), or the like. The controller 202 may perform various functions in the central processing apparatus 110, such as invoking or implementing the modules 204-212. According to an example, the modules 204-212 may be circuit components or individual circuits. According to another example, the modules 204-212 may be software modules, e.g., machine readable instructions, stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. According to a further example, the modules 204-212 may be a combination of hardware and software modules.

With reference now to FIG. 3, the antenna apparatus 120a, which may be representative of the other antenna apparatuses 120b-120n, may include a controller 302, an Ethernet packet receiving module 304, an OFDM I/Q sample generating module 306, an OFDM frame assembling module 308, a precoding matrix applying module 310, and a signal transmitting module 312. The Ethernet packet receiving module 304 may receive the Ethernet packets 230 communicated by the central processing apparatus 110 via the Ethernet switch 130. In addition, the Ethernet packet receiving module 304 may forward the received Ethernet packets 230 to the OFDM I/Q sample generating module 306 and the precoding matrix applying module 310. Alternatively, the Ethernet packet receiving module 304 may forward the received Ethernet packets to the OFDM I/Q sample generating module 306 without forwarding the received Ethernet packets 230 to the precoding matrix applying module 310.

The OFDM I/Q sample generating module 306 may generate OFDM I/Q samples from the Ethernet packets 230 and may forward the generated OFDM I/Q samples to the OFDM frame assembling module 308. The OFDM frame assembling module 308 may assemble the OFDM I/Q samples and training sequences (and/or pilot sequences) into an OFDM frame. The Ethernet packets 230 communicated to the antenna apparatus 120a may include the training sequences (and/or pilot sequences). The OFDM frame assembling module 308 may also modulate the data bits contained in the Ethernet packets 230. For instance, the OFDM assembling module 308 may map the data bits into signal constellation points, e.g., in a 4-QAM 2 bits are mapped into 4 constellation points (e.g., 4 points located on a unit circle in a complex plane). In addition, the OFDM frame assembling module 308 may forward the OFDM frame to the precoding matrix applying module 310.

The precoding matrix applying module 310 may identify the precoding matrix contained in the Ethernet packets 230 and may apply the identified precoding matrix on the OFDM frame received from the OFDM frame assembling module 308. According to an example, the OFDM frame contains all of the signals that are to be transmitted by each of the antenna apparatuses 120a-120n. As such, the precoding matrix applying module 310 may apply the precoding matrix, for instance, may multiply the data contained in the OFDM frame with the precoding matrix, to determine which portion of the OFDM frame pertains to the antenna apparatus 120a. In other words, the precoding matrix applying module 310 may determine the I/Q sequence 320 that is to be transmitted by the antenna apparatus 120a and may forward that I/Q sequence 320 to the signal transmitting module 312. The signal transmitting module 312 may wirelessly transmit signals 322 containing the I/Q sequence 320 for that antenna apparatus 120a.

The controller 302 may be a microprocessor, a microcontroller, an application specific integrated circuit (ASIC), or the like. The controller 302 may perform various functions in the antenna apparatus 120a, such as invoking or implementing the modules 304-312. According to an example, the modules 304-312 may be circuit components or individual circuits. According to another example, the modules 304-312 may be software modules, e.g., machine readable instructions, stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. According to a further example, the modules 304-312 may be a combination of hardware and software modules.

Although not shown, the antenna apparatus 120a may also include RF hardware, such as an analog to digital/digital to analog (AD/DA) converter, a modulator, a power amplifier, etc., to transmit signals over a wireless medium.

Figure 4:
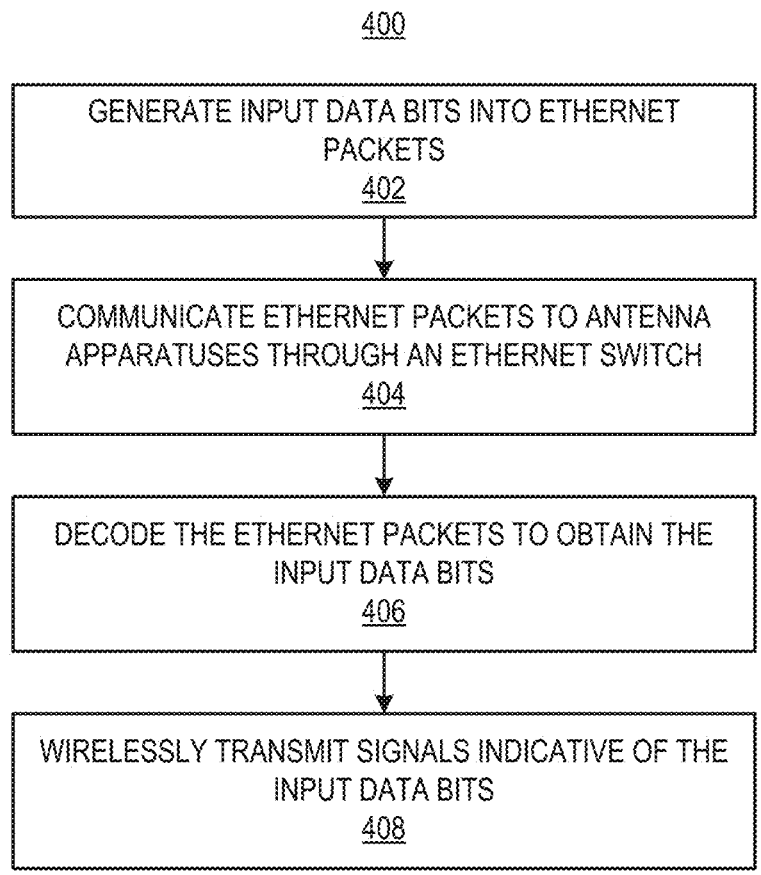
FIG. 4 shows a flow diagram of a method for communicating signals through a distributed antenna system, according to an example of the present disclosure.

Turning now to FIG. 4, there is shown a flow diagram of a method 400 for communicating signals through a distributed antenna system 100, according to an example. It should be apparent to those of ordinary skill in the art that the method 400 represents a generalized illustration and that other operations may be added or existing operations may be removed, modified or rearranged without departing from a scope of the method 400.

At block 402, in the central processing apparatus 110, bits of input data 220 may be generated into Ethernet packets, for instance, by the Ethernet packet generating module 210. The Ethernet packet generating module 210 may generate the Ethernet packets 230 from the bits of input data 220 through implementation of any suitable Ethernet packet generation scheme. In addition, the Ethernet packets 230 may be generated to include destination addresses of the plurality of antenna apparatuses 120a-120n in the packet headers.

At block 404, the Ethernet packets 230 may be communicated to the antenna apparatuses 120a-120n, in which the Ethernet packets 230 traverse an Ethernet switch 130 prior to arriving at the plurality of antenna apparatuses 120a-120n. The Ethernet packets 230 may be communicated by the Ethernet packet communicating module 212. Thus, for instance, the Ethernet packet communicating module 212 may include an Ethernet port into which an Ethernet cable is inserted, in which an opposite end of the Ethernet cable is connected to a port of the Ethernet switch 130. In addition, the Ethernet switch 130 may determine the destination addresses of the Ethernet packets 230 from the packet headers.

According to an example, the Ethernet packets 230 may be respectively addressed to the antenna apparatuses 120a-120n such that different data is communicated to each of the antenna apparatuses 120a-120n. In another example, the Ethernet packets 230 may be addressed to all of the antenna apparatuses 120a-120n such that each of the antenna apparatuses 120a-120n is to extract portions of the Ethernet packets 230 that are to be respectively transmitted by the antenna apparatuses 120a-120n. In this example, the antenna apparatuses 120a-120n may discard the respective portions of the Ethernet packets 230 that are not to be transmitted by the antenna apparatuses 120a-120n.

At block 406, the received Ethernet packets 230 may be decoded by each of the plurality of antenna apparatuses 120a-120n, for instance, by the OFDM assembling modules 306. Various operations performed on the Ethernet packets 230 in the antenna apparatuses 120a-120n are discussed in greater detail below.

At block 408, signals indicative of the input data bits may be wirelessly transmitted, for instance, by the signal transmitting modules 310. The signal transmitting module 310 of an antenna apparatus 102a may include an antenna to wirelessly transmit the signals, which may comprise RF signals. In addition, each of the antenna apparatuses 120a-120n may wirelessly transmit respective signals in a substantially coordinated and synchronized manner with respect to each other.

Figure 5:
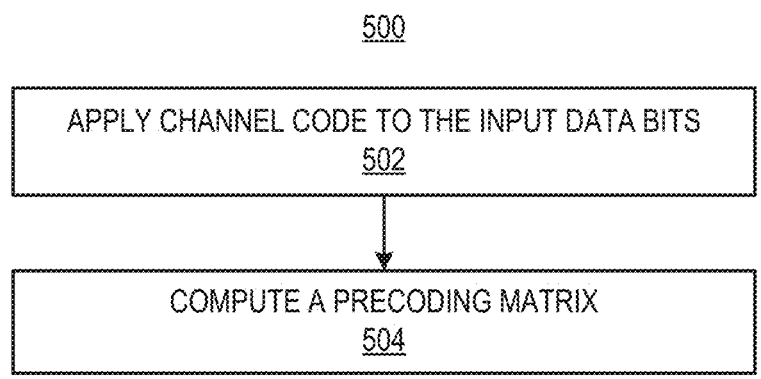
FIG. 5 shows a flow diagram of a method for generating Ethernet packets at a central processing apparatus, according to an example of the present disclosure.

Turning now to FIG. 5, there is shown a flow diagram of a method 500 for generating Ethernet packets 230 at the central processing apparatus 110, according to an example. In one regard, the method 500 depicts operations that the central processing apparatus 110 may perform prior to generation of the Ethernet packets 230 at block 402 in the method 400.

At block 502, a channel code may be applied to the input data bits 220, for instance, by the channel code applying module 206. Particularly, the channel code applying module 206 may apply a channel code to provide resilience against random errors that may occur over the wireless channel. According to an example, the channel code applying module 206 may apply a channel code to the input data bits for real-time error correction and may convert a stream of the input data bits into a single codeword.

At block 504, a precoding matrix may be computed, for instance, by the precoding matrix computing module 208. In addition, the Ethernet packets 230 may be generated to include the channel coded input data bits and the precoding matrix, for instance, as discussed above with respect to block 402 in FIG. 4.

Figure 6:
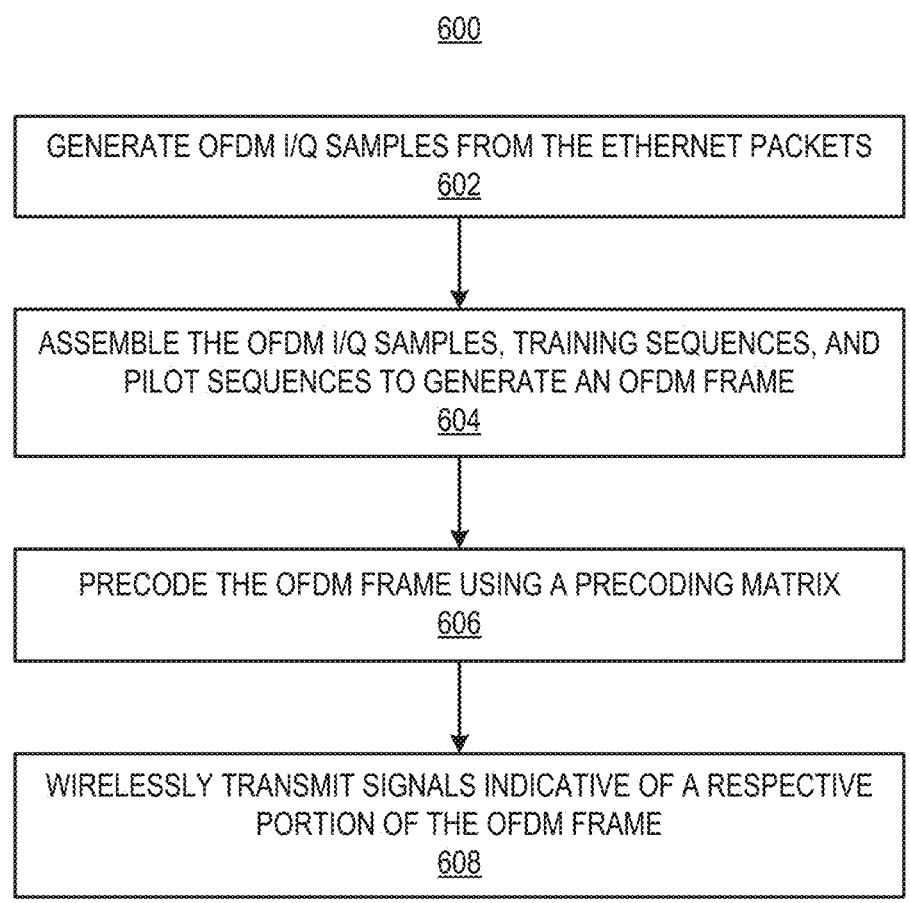
FIG. 6 illustrates a flow diagram of a method for decoding Ethernet packets and wirelessly transmitting signals at an antenna apparatus, according to an example of the present disclosure.

Turning now to FIG. 6, there is shown a flow diagram of a method 600 for decoding the Ethernet packets 230 and wirelessly transmitting signals at an antenna apparatus 120a, according to an example. In one regard, the method 600 depicts operations that may be performed by each of the antenna apparatuses 120a-120n at blocks 406 and 408 in the method 400.

At block 602, OFDM I/Q samples may be generated from the Ethernet packets 230, for instance, by the OFDM frame assembling module 306. In addition, at block 604, the OFDM I/Q samples may be assembled with training and pilot sequences to generate an OFDM frame, for instance, by the OFDM frame assembling module 308. The OFDM frame assembling module 308 may also modulate the data bits contained in the Ethernet packets 230.

At block 606, the OFDM frame may be precoded using a precoding matrix, for instance, by the precoding matrix applying module 310. According to an example, the precoding matrix applying module 310 may access the precoding matrix contained in the Ethernet packets 230. In addition, the precoding matrix may be applied to, e.g., multiplied with, the OFDM frame to determine which portions of the OFDM frame pertain to the antenna apparatus 120a. In this regard, although the OFDM frame contains all of the signals that are to be transmitted by each of the antenna apparatuses 120a-120n, the individual portions of the OFDM frame that the antenna apparatuses 120a-120n is to transmit may be determined through application of the precoding matrix.

At block 608, signals indicative of the respective portions of the OFDM frame that the antenna apparatus 120a is to transmit as determined at block 606 may be wirelessly transmitted, for instance, by the signal transmitting module 312.

Some or all of the operations set forth in the methods 400-600 may be contained as a utility, program, or subprogram, in any desired computer accessible medium. In addition, the methods 400-600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 7:
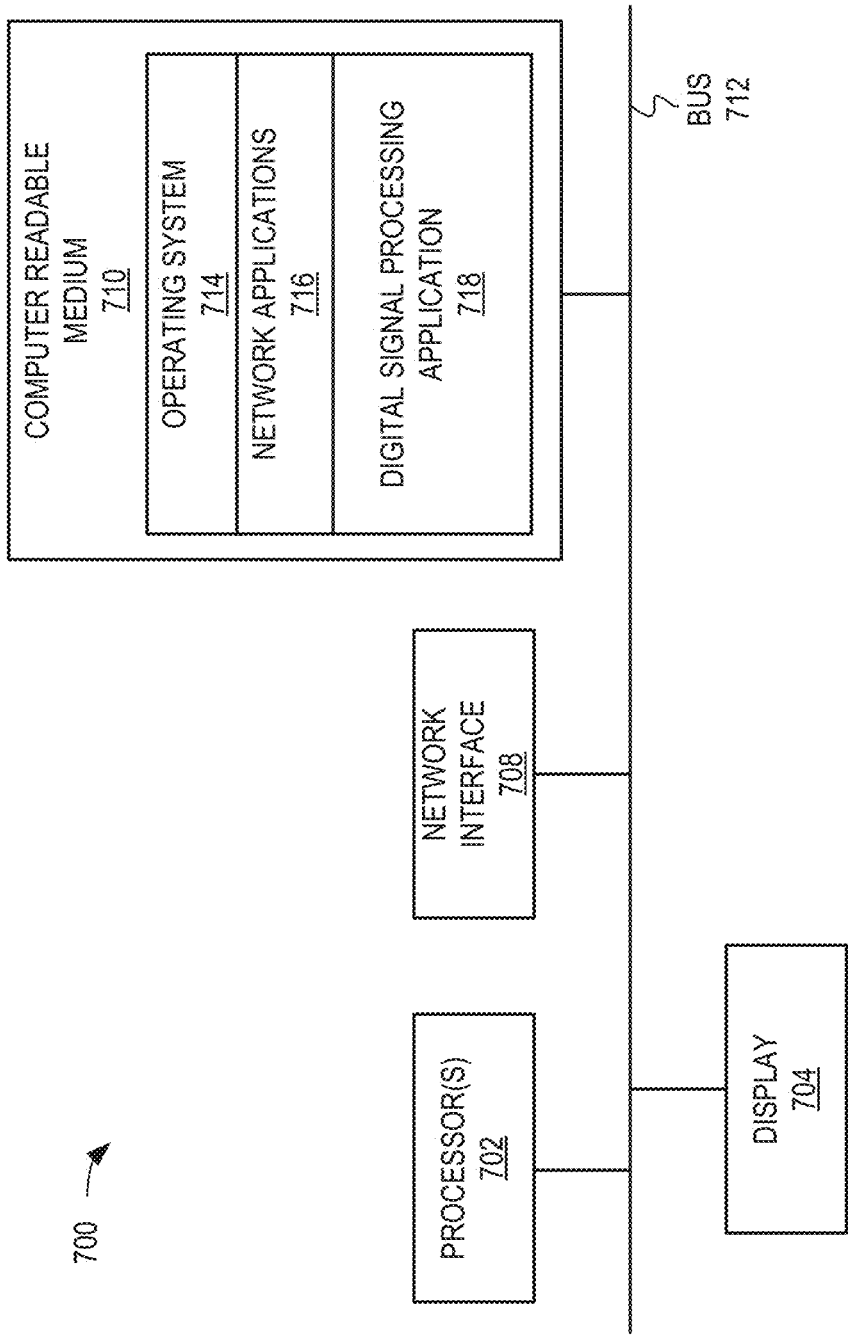
FIG. 7 illustrates a schematic representation of a computing device, which may be employed to perform various functions of the central processing apparatus depicted in FIGS. 1 and 2, according to an example of the present disclosure.

Turning now to FIG. 7, there is shown a schematic representation of a computing device 700, which may be employed to perform various functions of the central processing apparatus 110 depicted in FIGS. 1 and 2, according to an example. The device 700 may include a processor 702, a display 704, such as a monitor; a network interface 708, such as a Local Area Network LAN, a wireless 802.11x LAN, a 3G mobile WAN or a WiMax WAN; and a computer-readable medium 710. Each of these components may be operatively coupled to a bus 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 may be non-volatile media, such as an optical or a magnetic disk; volatile media, such as memory. The computer-readable medium 710 may also store an operating system 714, such as Mac OS, MS Windows, Unix, or Linux; network applications 716; and a digital signal processing application 718. The operating system 714 may be multi-user, multiprocessing, multitasking, multithreading, real-time and the like. The operating system 714 may also perform basic tasks such as recognizing input from input devices, such as a keyboard or a keypad; sending output to the display 704; keeping track of files and directories on the computer readable medium 710; controlling peripheral devices, such as disk drives, printers, image capture device; and managing traffic on the bus 712. The network applications 716 may include various components for establishing and maintaining network connections, such as machine-readable instructions for implementing communication protocols including TCP/IP, HTTP, Ethernet, USB, and FireWire.

The digital signal processing application 718 may provide various components for applying a channel code to input data bits, computing a precoding matrix, generating Ethernet packets to include the channel coded data bits and the precoding matrix, and communicating the Ethernet packets over a switched network environment, as described above with respect to the methods 400 and 500 in FIGS. 4 and 5.

The digital signal processing application 718 may thus include the data input module 204, the channel code applying module 206, the precoding matrix computing module 208, the Ethernet packet generating module 210, and the Ethernet packet communicating module 212. In certain examples, some or all of the processes performed by the digital signal processing application 718 may be integrated into the operating system 714. In certain examples, the processes may be at least partially implemented in digital electronic circuitry, or in computer hardware, machine-readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A distributed antenna system comprising:
   a central processing apparatus; and
   a plurality of antenna apparatuses connected to the central processing apparatus via Ethernet cables through an Ethernet switch, wherein the plurality of antenna apparatuses are to generate orthogonal frequency division multiplexing (OFDM) in phase/quadrature (I/Q) samples from Ethernet packets, wherein the Ethernet packets are generated to comprise a precoding matrix and a channel coded data to be wirelessly transmitted by each of the plurality of antenna apparatuses, wherein the plurality of antenna apparatuses are to assemble the OFDM I/Q samples, training sequences, and pilot sequences into an OFDM frame, wherein the central processing apparatus is to communicate the Ethernet packets to the plurality of antenna apparatuses and to apply a channel code to bits of the data and to compute the precoding matrix, wherein the plurality of antenna apparatuses are to wirelessly transmit signals corresponding to data contained in the Ethernet packets in a substantially coordinated and synchronized manner with respect to each other, wherein the signals wirelessly transmitted by the plurality of antenna apparatuses are contained in the OFDM frame, and wherein each of the plurality of antenna apparatuses is to transmit a respective portion of the OFDM frame based upon information contained in the precoding matrix.

2. The distributed antenna system according to claim 1, wherein the central processing apparatus is further to encode the Ethernet packets prior to communicating the Ethernet packets to the plurality of antenna apparatuses and wherein the plurality of antenna apparatuses are to decode the encoded Ethernet packets to obtain the data prior to transmitting the signals corresponding to the data.

3. The distributed antenna system according to claim 2, wherein the channel code is to provide resilience against random errors associated with wireless transmission of the signals by the plurality of antenna apparatuses.

4. The distributed antenna system according to claim 1, wherein at least one of phases and amplitudes of the signals transmitted by the plurality of antenna apparatuses are adjusted such that the signals are transmitted in the substantially coordinated and synchronized manner.

5. The distributed antenna system according to claim 1, wherein the Ethernet packets are at least one of respectively addressed to the plurality of antenna apparatuses such that different data is communicated to each of the plurality of antenna apparatuses and addressed to all of the plurality of antenna apparatuses such that each of the plurality of antenna apparatuses is to extract portions of the Ethernet packets that are to be respectively transmitted by the antenna apparatuses.

6. The distributed antenna system according to claim 1, wherein each of the plurality of antenna apparatuses comprises:
   a module to generate orthogonal frequency division multiplexing (OFDM) in phase/quadrature (IQ) samples from the Ethernet packets received from the central processing apparatus, wherein the received Ethernet packets comprise channel coded input data bits and a precoding matrix;
   a module to assemble the OFDM IQ samples, training sequences, and pilot sequences to generate an OFDM frame, wherein the OFDM frame contains signals to be wirelessly transmitted by a plurality of antenna apparatuses;
   a module to precode the OFDM frame based upon information contained in the precoding matrix to determine which portions of the OFDM frame pertain to the antenna apparatus;
   a module to wirelessly transmit signals indicative of the portions of the OFDM frame pertaining to the antenna apparatus; and
   a hardware controller to implement the modules.

7. A method for communicating signals through a distributed antenna system composed of a central processing apparatus and a plurality of antenna apparatuses, said method comprising:
   in the central processing apparatus,
      generating input data bits into Ethernet packets; and
      communicating the Ethernet packets to the plurality of antenna apparatuses, wherein the Ethernet packets traverse an Ethernet switch prior to arriving at the plurality of antenna apparatuses; and
   in each of the plurality of antenna apparatuses,
      generating orthogonal frequency division multiplexing (OFDM) in phase/quadrature (I/Q) samples from the Ethernet packets;
      assembling the OFDM I/Q samples, training sequences, and pilot sequences to generate an OFDM frame, wherein the signals wirelessly transmitted by the plurality of antenna apparatuses are contained in the OFDM frame;
      computing a precoding matrix that identifies which streams of data are intended for transmission by which of the plurality of antenna apparatuses;
      precoding the OFDM frame based upon information contained in the precoding matrix, wherein wirelessly transmitting signals indicative of the input data bits further comprises wirelessly transmitting signals indicative of a respective portion of the OFDM frame as identified through the precoding of the OFDM frame;
      decoding the Ethernet packets to obtain the input data bits;

applying a channel code to the input data bits to encode the input data bits: and wirelessly transmitting signals indicative of the input data bits in a substantially coordinated and synchronized manner with respect to each other.

8. The method according to claim 7, wherein generating the input data bits into Ethernet packets further comprises generating the Ethernet packets to include the channel coded data and the precoding matrix.

9. The method according to claim 7, further comprising:

addressing the Ethernet packets for respective delivery of the Ethernet packets to each of the plurality of antenna apparatuses; and wherein communicating the Ethernet packets further comprises communicating the Ethernet packets to the plurality of antenna apparatuses based upon the addresses of the Ethernet packets.

10. The method according to claim 7, further comprising:

addressing the Ethernet packets for delivery to each of the plurality of antenna apparatuses; and wherein each of the plurality of antenna apparatuses is to extract portions of the Ethernet packets that are to be respectively transmitted by the antenna apparatuses.

11. The method according to claim 7, further comprising:

adjusting at least one of phases and amplitudes of the signals transmitted by the plurality of antenna apparatuses such that the signals are transmitted in the substantially coordinated and synchronized manner.

12. A central processing apparatus comprising:

a hardware controller comprising a processor;

a module coupled to the processor to channel code bits of input data;

a module coupled to the processor to compute a precoding matrix for a plurality of antenna apparatuses, wherein the plurality of antenna apparatuses are to generate orthogonal frequency division multiplexing (OFDM) in phase/quadrature (I/Q) samples from Ethernet packets, and wherein the plurality of antenna apparatuses are to assemble the OFDM I/Q samples, training sequences, and pilot sequences into an OFDM frame; wherein the plurality of antenna apparatuses are to wirelessly transmit signals corresponding to data contained in the Ethernet packets in a substantially coordinated and synchronized manner with respect to each other, wherein the signals wirelessly transmitted by the plurality of antenna apparatuses are contained in the OFDM frame, and wherein each of the plurality of antenna apparatuses is to transmit a respective portion of the OFDM frame based upon information contained in the precoding matrix;

a module coupled to the processor to generate the Ethernet packets that include the channel coded bits of input data and the computed precoding matrix; and a module coupled to the processor to communicate the Ethernet packet to the plurality of antenna apparatuses over a switched Ethernet connection.

13. The central processing apparatus of claim 12, further comprising:

a module coupled to the processor to decode the Ethernet packets to obtain the input data bits; and a module coupled to the processor to wirelessly transmit signals indicative of the input data bits in a substantially coordinated and synchronized manner with respect to each other.

14. The central processing apparatus of claim 12, wherein the module to channel code bits of input data is further to apply a channel code to the input data bits to encode the input data bits.

15. The central processing apparatus of claim 12, wherein the module to compute the precoding matrix is further to compute the precoding matrix that identifies which streams of data are intended for transmission by which of the plurality of antenna apparatuses.

16. The central processing apparatus of claim 12, wherein the module to generate the Ethernet packets is further to generate the Ethernet packets to include the channel coded data and the precoding matrix.

17. The central processing apparatus of claim 12, further comprising:

a module coupled with the processor to address the Ethernet packets for respective delivery of the Ethernet packets to each of the plurality of antenna apparatuses, wherein communicating the Ethernet packets further comprises communicating the Ethernet packets to the plurality of antenna apparatuses based upon the addresses of the Ethernet packets, and wherein each of the plurality of antenna apparatuses is to extract portions of the Ethernet packets that are to be respectively transmitted by the antenna apparatuses.

18. The central processing apparatus of claim 12, further comprising:

a module coupled to the processor to adjust at least one of phases and amplitudes of the signals transmitted by the plurality of antenna apparatuses such that the signals are transmitted in the substantially coordinated and synchronized manner.

* * * * *